G. RACE.
Grain Drill.
No. 52,319.
Patented Jan. 30, 1866.
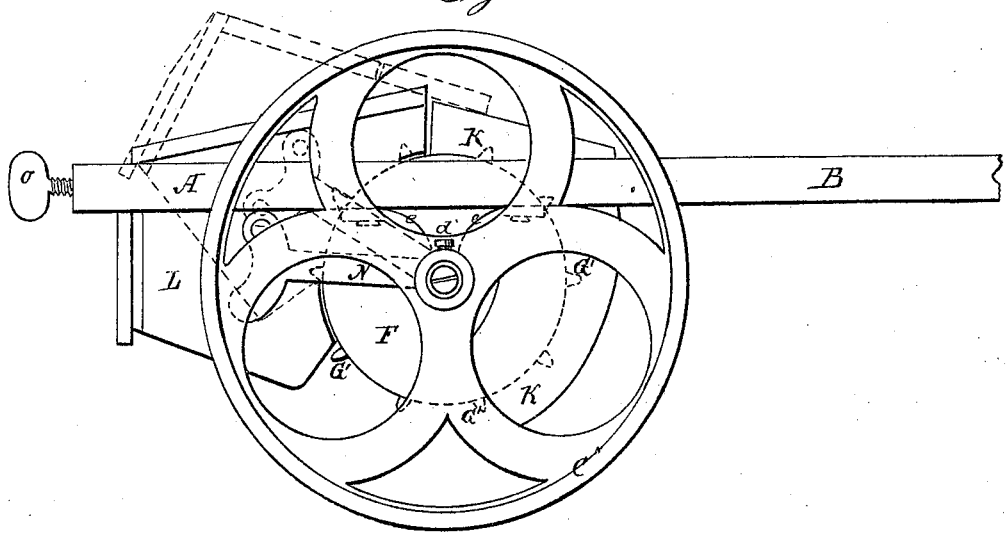
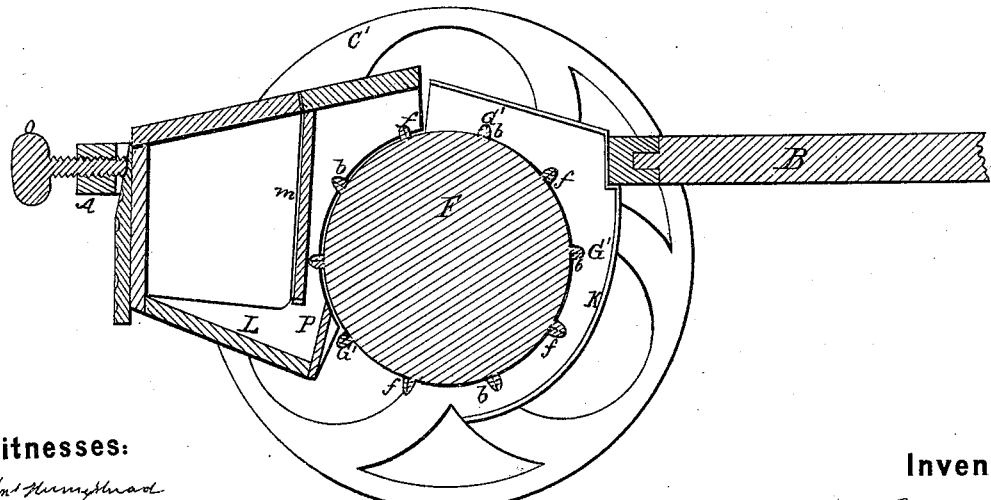
Witnesses:
Inventor:
George Race.

UNITED STATES PATENT OFFICE.

GEORGE RACE, OF NORWICH, NEW YORK.

IMPROVEMENT IN BROADCAST-SEEDERS.

Specification forming part of Letters Patent No. 52,319, dated January 30, 1866.

*To all whom it may concern:*

Be it known that I, GEORGE RACE, of Norwich, Chenango county, State of New York, have invented a new and Improved Broadcast Seed-Sower; and I do hereby declare that the following is a full and exact description thereof, reference being had to the accompanying drawings, and to the letters of reference marked thereon.

To enable others skilled in the art to make and use my invention, I will proceed to describe its construction and operation.

In Figure 1, A is the frame, of proper size and strength. B, Figs. 1 and 2, is the tongue or thills. $c'$ $c''$ are the wheels, one of which, $c'$, is loose constantly for the purpose of turning. The other, $c''$, can be fastened to the axle by the set-screw $d$. To the frame A, I attach the suspended boxes or bearings $e$ for the axle, which may or may not pass entirely through the drum. I construct the drum F of the proper length and diameter, and upon it place longitudinal ribs G, made of any material and in any convenient manner for the purpose of producing the desired results. Upon these ribs I place blocks $f$, or make excavations G' at such places or points as I may elect, taking care that the same shall be so arranged upon the several ribs as to alternate, which may be seen in Fig. 3. Around the drum on the front side I put a convenient case, K. I then make the hopper L, which is divided by a number of partitions, and of such size that it will swing within the frame A. The front board of the hopper M should be made adjustable for the purpose of regulating the delivery of the grain therefrom. This hopper L is concave on its front side, so as to allow it to rotate around the drum F, and is attached to the axle by means of the arms N, Fig. 1. The position of the said hopper is regulated by means of the set-screw O, which passes through the frame A. Upon the under side of the hopper L, I place a swing-valve, P, (see Fig. 2,) by means of which the escape of the grain is regulated, as will be hereinafter shown.

From the foregoing description the operation of my seed-sower can be readily understood. For example, by turning the set-screw $d$ the wheel $c''$ is firmly fixed to the axle, which, when the machine is moved, causes the drum to revolve.

It will be observed that if the hopper L be allowed to remain in the position shown in Fig. 2 no grain will escape, for the swing-valve P, being held up by the incline-blocks $f$, will prevent it; but when the hopper L is raised, as shown in Fig. 1, the grain presses against the swing-valve P, which valve does not allow its escape while passing over the inclines or blocks $f$, but as the drum revolves and the cup or excavation G is presented to the valve the grain fills the same, and it is permitted to pass out of the cup as the said drum revolves. It will be seen that the greater the elevation of the hopper the more rapidly the grain can be discharged. The object of the divisions in the hopper is to keep the grain in its proper place when my machine is used upon such ground as to cause one side of the same to be higher than the other.

Having thus described the construction and operation of my machine, what I claim, and for which I desire to procure Letters Patent, is—

1. A broadcast seed-sower having a rotating and adjustable hopper, for the purpose of regulating the quantity of grain to be distributed.

2. In connection with the rotating hopper, the swing-valve, when used for the purposes and substantially as described.

3. In connection with the swing-valve, the drum, with its longitudinal ribs, having cups located alternately, as shown.

4. In connection with the swing-valve, the elevations or inclines upon the longitudinal ribs, for the purposes shown and discribed.

GEORGE RACE.

Witnesses:
JOHN S. HOLLINGSHEAD,
JOHN D. BLOOR.